Oct. 9, 1951  H. E. STOVER  2,570,729
MACHINE FOR INSPECTING GLASS CONTAINERS AND THE LIKE
Filed April 27, 1948  5 Sheets-Sheet 1
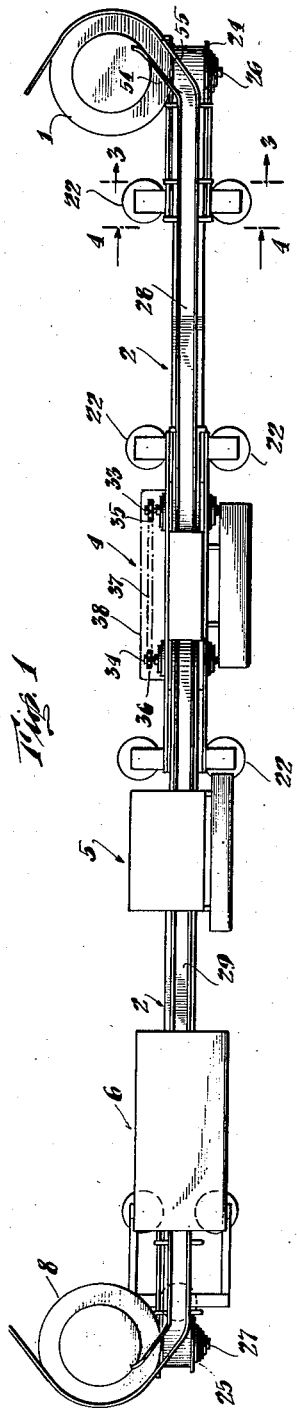
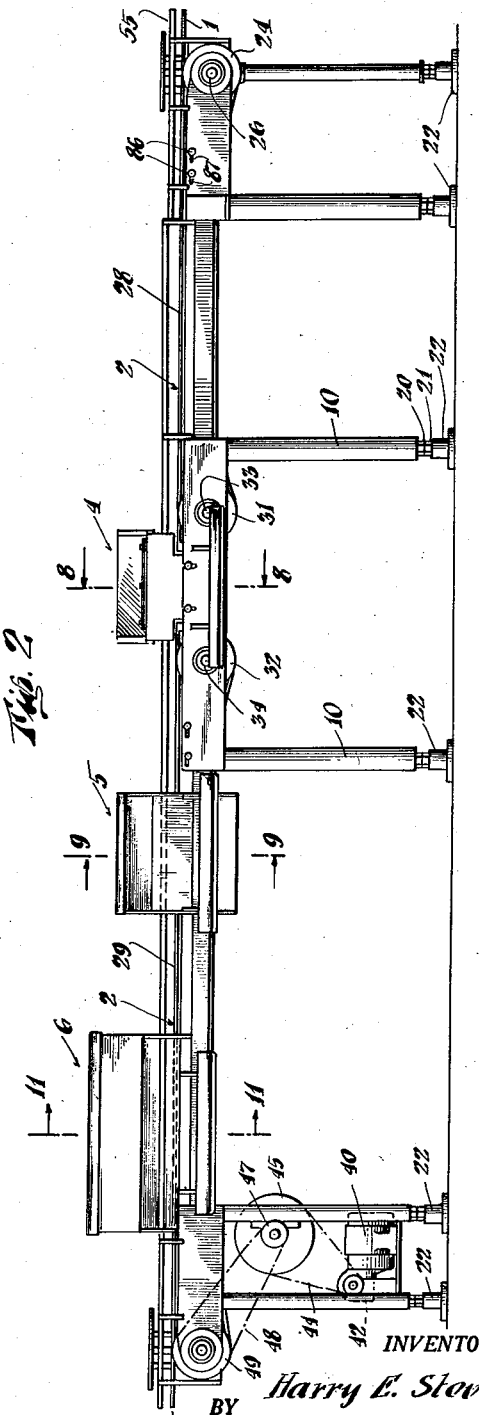
INVENTOR.
*Harry E. Stover*
BY *Norman N. Holland*
ATTORNEY Oct. 9, 1951 H. E. STOVER 2,570,729
MACHINE FOR INSPECTING GLASS CONTAINERS AND THE LIKE
Filed April 27, 1948 5 Sheets-Sheet 2
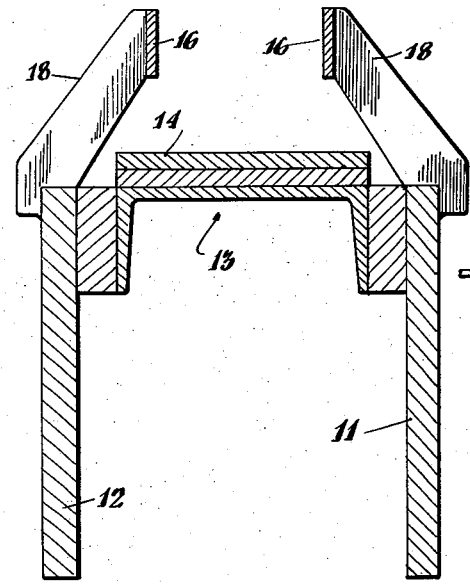
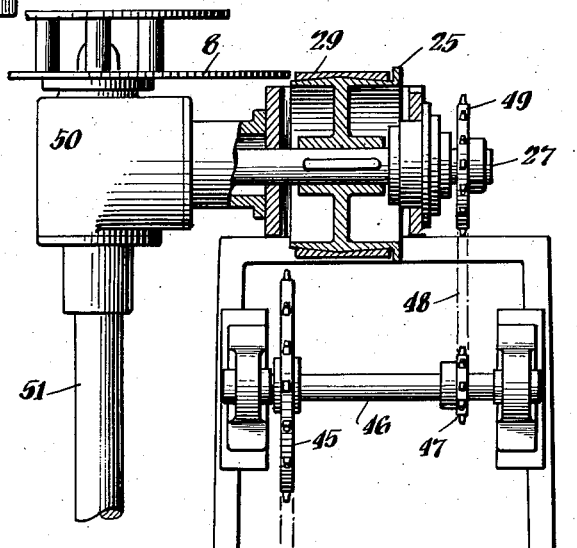
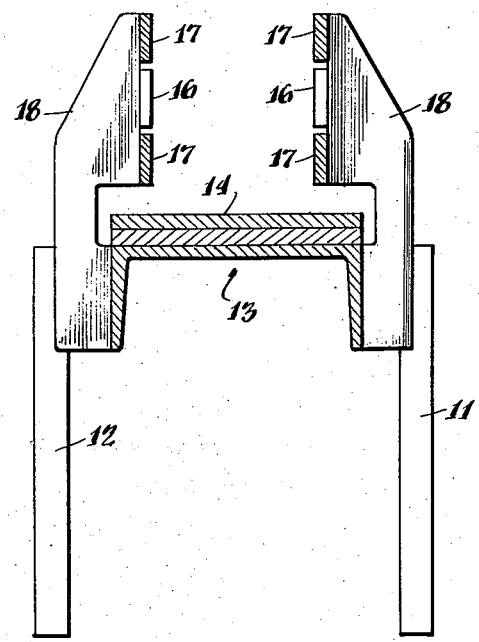
INVENTOR.
*Harry E. Stover*
BY
*Norman N. Holland*
ATTORNEY

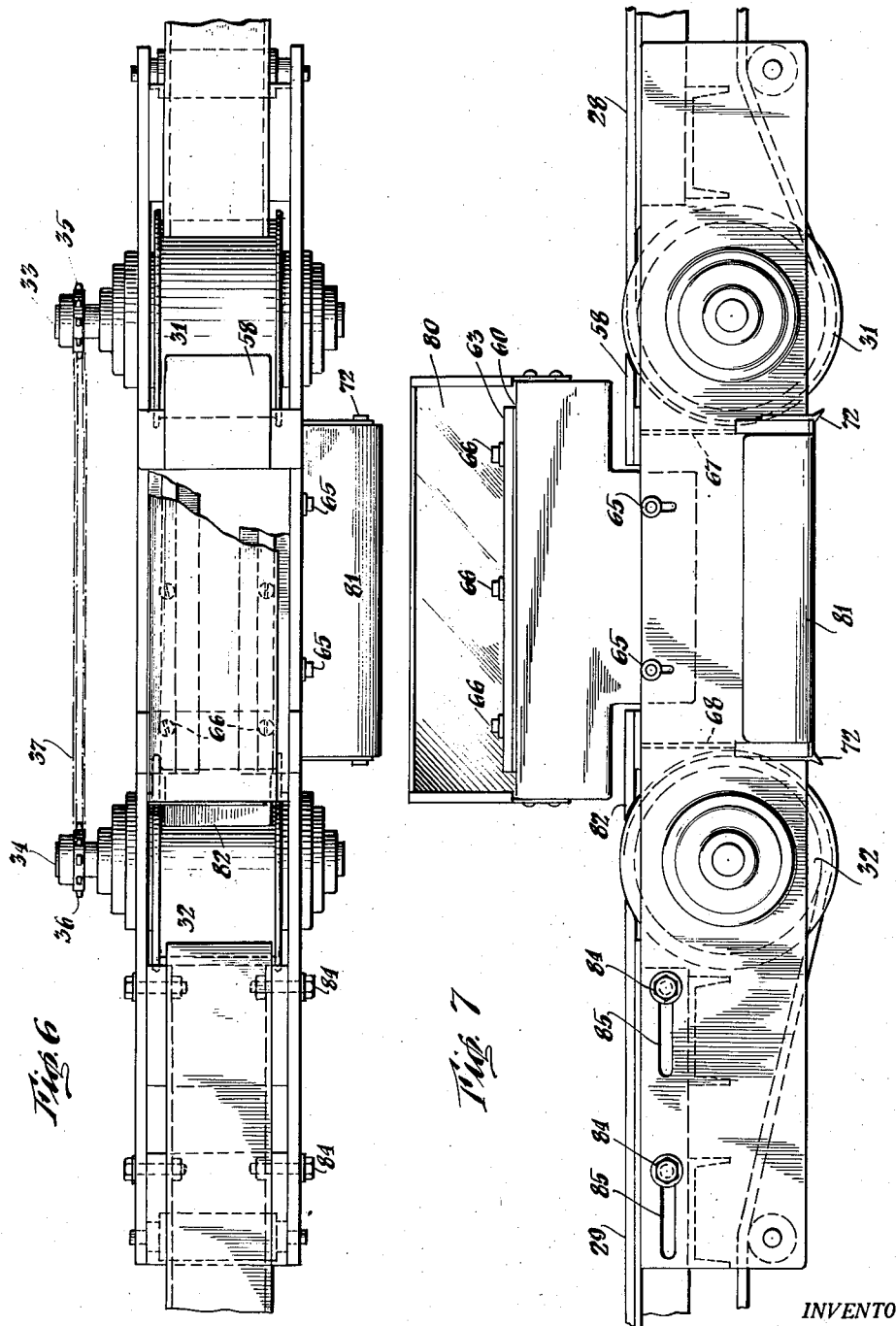

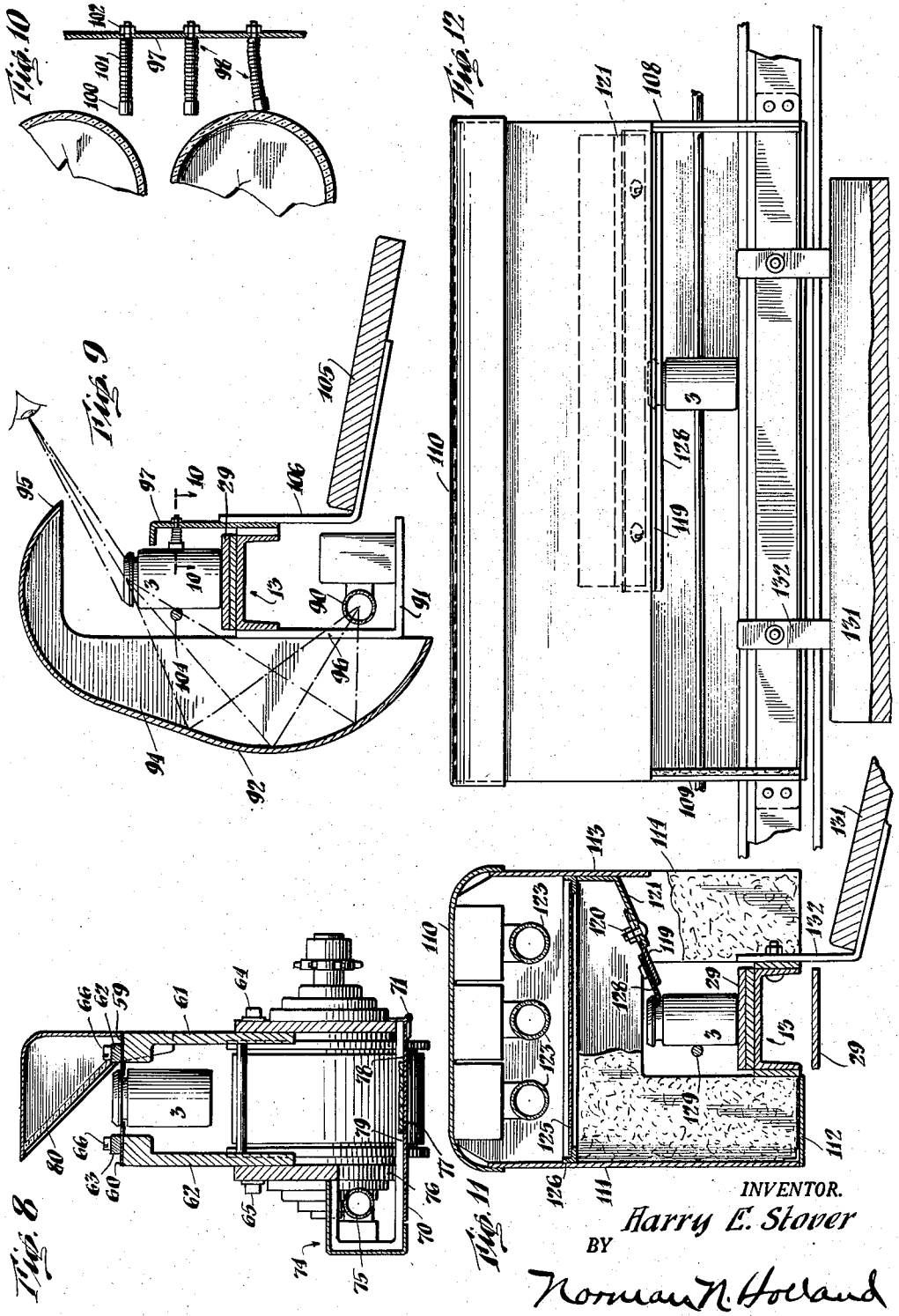

Oct. 9, 1951 H. E. STOVER 2,570,729
MACHINE FOR INSPECTING GLASS CONTAINERS AND THE LIKE
Filed April 27, 1948 5 Sheets-Sheet 5
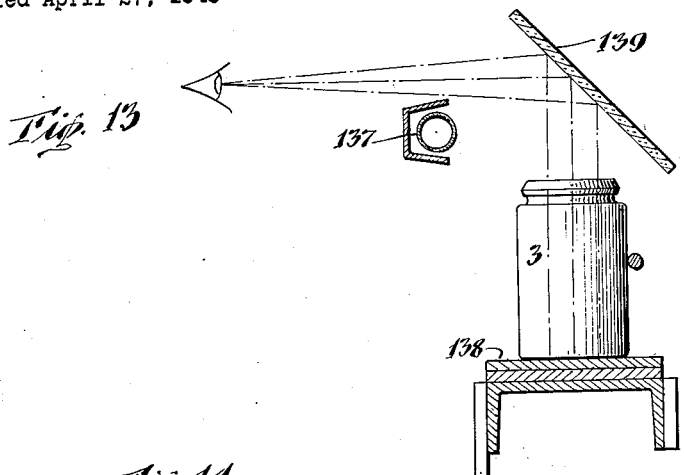
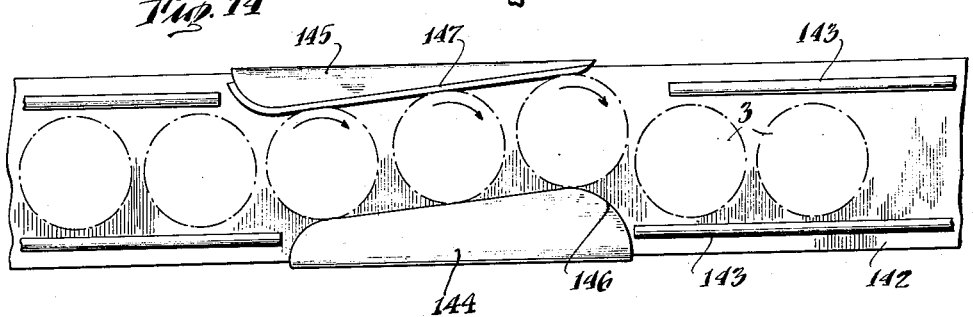
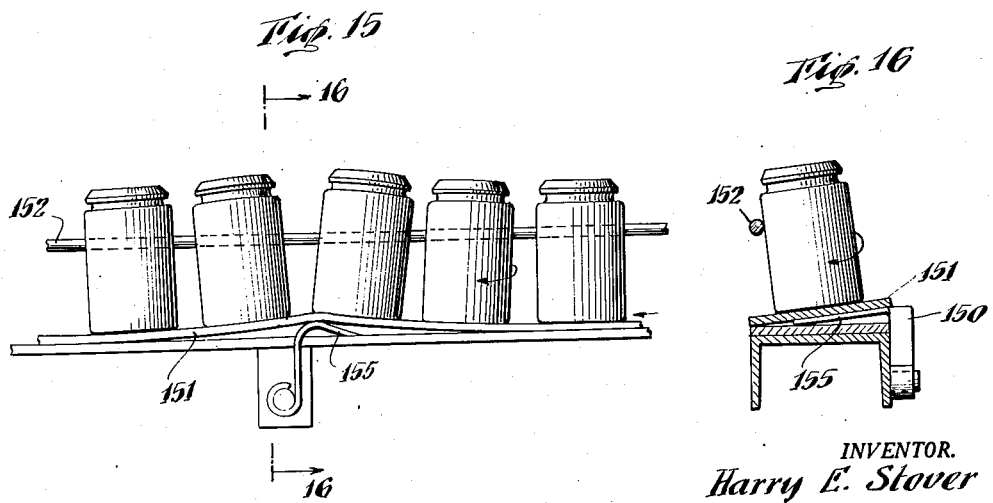
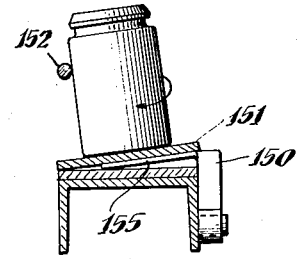
INVENTOR.
Harry E. Stover
BY
Norman N. Holland
ATTORNEY Patented Oct. 9, 1951

2,570,729

UNITED STATES PATENT OFFICE 2,570,729

MACHINE FOR INSPECTING GLASS CONTAINERS AND THE LIKE

Harry E. Stover, Lancaster, Ohio, assignor to Anchor Hocking Glass Corporation, Lancaster, Ohio, a corporation of Delaware Application April 27, 1948, Serial No. 23,573

14 Claims. (Cl. 88—14)

The present invention relates to a machine for inspecting articles made of glass and the like and is particularly applicable to the inspection of glass food containers which have special requirements as to the finish for hermetic sealing and special requirements as to freedom from particles of glass and as to fins and burrs which might break and form them.

Great quantities of foodstuffs are packed in jars or containers made of glass. Due to various conditions of manufacture and to the materials utilized in the formation of containers, many of the formed containers embody slight defects which render their commercial use undesirable. Defects may occur in the bottom walls, in the side walls, and in the "finish" zones or sealing surfaces adjacent the container mouth with which a closure or cover engages. The defects may comprise large or small bubble-like formations, fold-like streaks in the glass, elongate cavities, objectionably varying sealing surface dimensions, etc.; another and highly objectionable defect is that of loose particles or pieces of glass finding their way into a container at some stage during manufacture.

Companies engaged in the manufacture of glass containers have for some time sought to provide a machine which could be used for inspecting and facilitating the removal of containers embodying defects such as those mentioned above. Previous attempts have proven objectionable in that, among other reasons, they have been too slow or laborious, they have not provided for continuously and rapidly inspecting containers at some stage in the manufacture thereof, various defects have not been clearly revealed, special darkened rooms or lenses have been required. Other attempts have not provided for readily and clearly inspecting all portions of the containers or other articles.

The present invention aims to overcome above and other difficulties or disadvantages by providing a machine for inspecting a continuously moving row of containers which may be used under lighting conditions normally existing in manufacturing plants. The invention further contemplates the provision of a container inspecting machine embodying means for examining the bottom walls of continuously moving glass containers, means for examining the sealing finishes of continuously moving glass containers, and means for examining the side walls of continuously moving glass containers.

An object of the present invention is to provide a new and improved machine for inspecting containers.

Another object of the invention is to provide a new and improved machine for inspecting a continuously moving row of glass containers or the like.

Another object is to provide an inspecting machine embodying means for examining the bottom walls, the finishes and surfaces adjacent the mouth of the container, and the side wall portions of containers.

Another object is to provide new and improved means for inspecting container bottom walls.

Another object is to provide new and improved means for inspecting container side walls.

Another object is to provide new and improved means for inspecting container finishes.

A still further object is to provide new and improved means for effecting rotation of moving containers during examination or inspection thereof.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a top plan view illustrating one form of the present container inspecting machine;

Fig. 2 is a side elevational view of the machine illustrated in Fig. 1;

Fig. 3 is a sectional view taken along the line 3—3 of Fig. 1;

Fig. 4 is a sectional view taken along the line 4—4 of Fig. 1;

Fig. 5 is an end view, partially broken away and sectionalized, showing a driving means for the inspecting machine illustrated in Figs. 1 and 2;

Fig. 6 is an enlarged fragmentary plan view, partly broken away, illustrating the container bottom inspecting portion of the machine shown in Figs. 1 and 2;

Fig. 7 is a side elevational view of the portion of the machine illustrated in Fig. 6;

Fig. 8 is an enlarged sectional view taken along the line 8—8 of Fig. 2 at the container bottom inspecting portion of the machine;

Fig. 9 is an enlarged sectional view taken along the line 9—9 of Fig. 2 at the container finish inspection portion of the machine;

Fig. 10 is a horizontal sectional view taken along the line 10—10 of Fig. 9;

Fig. 11 is an enlarged vertical sectional view taken along the line 11—11 of Fig. 2 at the container side wall inspecting portion of the machine;

Fig. 12 is a side elevational view of the container side wall inspecting means illustrated in Fig. 11;

Fig. 13 is a sectional view showing another form of container bottom wall inspecting means;

Fig. 14 is a fragmentary plan view illustrating another form of container rotating means;

Fig. 15 is a fragmentary side elevational view illustrating another form of container rotating means; and Fig. 16 is a view taken along the line 16—16 of Fig. 15;

Described generally the present machine comprises (Figs. 1 and 2) a rotatable inlet or entrance disc 1 adapted to present containers to conveyor means 2, which moves the containers in single file toward and through container bottom inspecting means 4, container finish inspecting means 5 and container side wall inspecting means 6. Upon emergence from the container side wall inspecting means 6, the conveyor means 2 transfers the containers to a rotating exit or discharge disc 8, which delivers the inspected containers to a packing conveyor (not shown) or to any other suitable device. Preferably the inspecting machine is positioned closely adjacent the discharge end of an annealing leer, from which it receives formed containers.

For purposes of convenience in description the present inspecting machine will be referred to and illustrated in connection with the inspection of containers having a finish or neck zone adapted to be sealed by closure caps of the "push down" type. The machine is equally adapted to the inspection of other types or shapes of containers, for example, those having the usual screw thread formed at the upper part adjacent the mouth thereof.

In Figs. 1, 2 and 5 upright legs 10 are shown connected with and supporting a conveyor framework or foundation, the conveyor framework comprising longitudinally extending spaced side portions 11 and 12 and an intermediate substantially flat and longitudinally extending table-like portion 13 adapted to support a conveyor belt 14 movable along and over the upper horizontal surface thereof. Side members or guides 16 and 17 extend longitudinally along opposite sides of the conveyor belt 14 and table structure 13 and may be supported in position by arms or brackets 18 connected with the conveyor framework or foundation. The spaced longitudinally extending guide members 16 and 17 serve to accurately position containers transversely of the conveyor belt 14 which, in use, travels longitudinally along the underlying supporting table 13.

Provision for longitudinal adjustment of the guide members 16 and 17 with respect to each other in connection with conveyor belt adjustment is obtained by the guide members 16 at one portion of the machine extending between the vertically spaced guide members 17 carried by another portion of the machine; the overlapping relationship of the guide members 16 and 17 facilitates adjustments without interrupting the continuity of the container guides.

Height adjustment or leveling of portions of the conveyor framework, together with the inspecting means located at spaced intervals therealong, may be obtained by appropriately positioning the adjustment nuts 20 and 21 shown adjacent the lower ends of the supporting legs 10 and above the foot members 22.

The conveyor means is shown in Figs. 1 and 2 supported at opposite ends of the machine on pulleys 24 and 25 mounted on shafts 26 and 27, rotatably positioned on the conveyor supporting framework. As shown in Figs. 1 and 2, and in the enlarged views of Figs. 6 and 7, the conveyor means comprises two separate conveyor belts 28 and 29, the belts being spaced from each other adjacent the container bottom inspecting means 4. The adjacent ends of the two conveyor belts 28 and 29 pass around pulleys 31 and 32, rotatably supported on cross shafts 33 and 34. One end of each of the cross shafts 33 and 34 is provided with a sprocket 35 and 36 respectively, the two sprockets being interconnected by a drive chain 37. When one of the drive belts (29) is actuated the other belt (28) is caused to move corresponding amounts, whereby the upper surfaces of the belts each move at the same lineal rate. A cover 38 may be provided to conceal the sprockets and interconnecting chain and to minimize the possibility of injury to an operator.

The outer or exposed surface of each of the conveyor belts 28 and 29 is preferably of some dark color, such as black or brown, the reason for which will be brought out hereinafter in connection with the description of the inspecting of containers.

The container belt 29 may be adjusted to maintain it in suitably taut position by loosening the adjustment bolts 84 and shifting the side members which carry the pulley 32 and cross shaft 34; the slots 85 facilitate desired adjustments and a particular position may be maintained by tightening the adjustment bolts 84. The conveyor belt 28 may be similarly adjusted by adjustment bolts and slots 86, 87, respectively.

Actuation or movement of the conveyor belts 28 and 29 may be achieved (Figs. 1 and 5) by a single electric motor 40, shown secured to platform 41, through the intermediation of a speed reducing mechanism 42, sprocket 43, drive chain 44, sprocket 45, drive shaft 46, sprocket 47, chain 48, sprocket 49, and drive pulley 25. The conveyor belt 29 passes around the drive pulley 25 and serves to rotate or turn the drive pulley 32 and cross shaft 34 which supports the belt 29 at its opposite end. As previously pointed out, the cross shaft 34 is connected with the cross shaft 33 and drive pulley 31 through sprocket 36, drive chain 37, sprocket 35 and pulley 31; thus the "initial" container moving belt 28 may be actuated.

The cross shaft 27 which carries the pulley 25 located adjacent the discharge end of the machine also serves to rotate the discharge disc 8 shown at the left side of Figs. 1 and 2 through the intermediation of suitable gears (not shown) contained within a gear box 50, and upright shaft 51 which carries the disc 8 adjacent its upper end. The inlet or entrance disc 1 shown at the right side of Figs. 1 and 2 may be rotated by the driven belt 28 through the pulley 24, cross shaft 26, and gear box and shaft (not shown) similar to the gear box 50 and shaft 51 illustrated in Fig. 5.

The drive motor 40 is rotated in such a direction as to move the upper surfaces of the conveyor belts 28 and 29 toward the left, as illustrated in Figs. 1 and 2. Containers delivered to the entrance or feed disc 1 are in turn moved by it toward and between angularly positioned guide rails 54 and 55 and between these latter rails or guides to the "initial" belt 28 of the conveyor means. The spaced guide members extending along opposite sides of the conveyor 28 accurately position containers transversely of the conveyor belt 28 so that they are in correct position or alignment for presentation to the container bottom inspection means 4 shown disposed intermediate adjacent ends of the "initial" conveyor belt 28 and the "subsequent" conveyor belt 29.

The initial conveyor belt 28 moves the containers toward and delivers them onto a dead plate or supporting plate 58 located adjacent the entrance to the container bottom inspecting means 4. For purposes of clarity the bottom inspection means and the parts of the machine adjacent thereto are shown enlarged in Figs. 6 and 7, with the guide rails or members omitted, and in Fig. 6 with the conveyor belts 28 and 29 omitted. A container 3 delivered onto the dead plate 58 has its reduced neck portion in alignment with and adapted to receive oppositely disposed, transversely adjustable, guiding and supporting members 59 and 60. A container delivered onto the dead plate 58 is pushed by succeeding containers of the continuously moving row forwardly between the spaced supporting and guiding members 59 and 60. The container 3 is thus supported adjacent its neck and moved along through the bottom inspecting compartment or chamber 4; the containers are pushed over the dead plate 58 until they are suspended in mid-air (Fig. 8) in such manner that their bottom portions are unobstructed.

The bottom inspecting compartment illustrated in Figs. 6, 7 and 8 comprises vertically adjustable side walls 61 and 62 adjustably retained in position by threaded bolts 64 and 65 to spaced side portions of the conveyor framework. End walls or bulkheads 67 and 68 may be welded into position to close the ends of the compartment, the lower part of the compartment being closed by a panel 70 movably secured by a hinge 71 at one side thereof. Latch members 72 may normally retain the bottom member 70 in closed position but may be released for cleaning examination or the like. If desired, the bulkheads may be omitted, the adjacent dark colored outer surfaces of the downwardly curving conveyor belts 28 and 29 and the dead plates 58 and 82 serving to close the ends of the compartment.

The lower part of the bottom inspecting chamber is shown provided with an offset portion 74 within which is located a source of illumination, preferably a longitudinally extending fluorescent tube 75. Light from the fluorescent tube 75 passes through an adjacent opening 76 and into the lower part of the container bottom inspecting compartment. The interior surface of the bottom member 70 is preferably provided with a length or coating of black velvet 77 disposed lengthwise with respect to the space intermediate the container supporting guides 59 and 60, and substantially in alignment with the said space. Side areas 78 and 79 extending longitudinally along the edges of the black velvet strip 77 are preferably white or some other light color and preferably the upwardly extending side and end walls 61, 62, 67 and 68 are coated with black velvet or painted black. A reflector or mirror 80 is adjustably positioned adjacent the upper part of the compartment in such manner that an observer looking into the mirror may readily see the bottoms of containers 3 which are moving along beneath the mirror intermediate the spaced supporting and guiding members 59 and 60. Light or illumination from the fluorescent tube 75 illuminates the interior of the box-like bottom inspecting chamber. As containers move along between the spaced guides 59 and 60 and above the black velvet bottom strip 77 any defects present at the bottom of the jar, such as a glass particle, cavity or the like show up clearly and vividly against the black velvet background. Light from the fluorescent tube 75 is refracted by the particle, bubble or other defect and causes the defect to be clearly and strongly illuminated. The lighter colored side portions 78 and 79 exposed along the edges of the black velvet strip 77 have been found to facilitate the definition or showing up of any defects in the bottoms of the containers. It might be supposed that one would normally inspect the bottoms of containers against other than a black background; it has been found, however, that the use of the dull black or black velvet background greatly enhances the detection of defects present in container bottoms.

Defective containers may be removed by the observer as they emerge from the outlet side of the spaced supporting guides 59 and 60 and are deposited on the outlet delivery plate or dead plate 82 and pushed therefrom by following containers onto the subsequent conveyor belt 29. An arm rest 81 may be provided for the convenience of an observer.

The container supporting and guiding members 59 and 60 may be of any suitable shape, size or configuration, depending upon the particular shapes of containers which are to move between them. Preferably the guiding members 59 and 60 are adjustable toward or away from each other and may be retained in position by holding members 62 and 63 and bolts 66.

As previously pointed out, the conveyor belts 28 and 29 are driven at the same speed so that their upper surfaces have the same lineal rate of movement and containers flow along in smooth and uninterrupted movement toward, through, and away from the container bottom inspection means 4. While passing through the bottom inspection means observers attention is concentrated upon the container bottoms and is not distracted by container side wall or finish portions.

The conveyor belt 29 at the exit side of the bottom inspection means 4, moves containers away from the bottom inspection means and moves them through a container finish inspection means 5 (Figs. 1, 2 and 9). As shown in these figures the finish inspection means comprises the conveyor supporting structure 13 which serves to support the travelling belt 29 in horizontal position, an illumination source such as a fluorescent tube 90 carried by a bracket 91 secured to the conveyor framework 13, and of a shape to position the fluorescent tube below and preferably beneath the moving conveyor 29 and its supporting structure 13, and also a shield 92 which extends from a position adjacent the fluorescent tube 90 upwardly around the rearward edge or side of the conveyor belt 29 and arches over and downwardly toward the conveyor belt 29.

Illumination from the fluorescent tube 90 passes into the interior of the shield through an open portion 96 at the lower part thereof, the opening 96 extending longitudinally of the belt 29 and being substantially co-extensive with the length of the fluorescent tube 90; thus illumination from the fluorescent tube 90 is directed against the interior of the shield 92 along a substantial portion of the length of a row of moving containers. The shield or reflector 92 is not limited to the precise shape illustrated as any suitable shape may be utilized, preferably one which is adapted to direct light rays from the fluorescent tube 90 to the finish zone portions of containers 3 moving along in front of and beneath the shield 92. Preferably the front or interior of the shield 92 is coated with an unglazed sheet of white paper as such provides a reflecting surface which directs light rays toward the container finishes without objectionable glare or brightness. The end walls 94 of the shield are preferably a dull black or coated with black velvet.

In order to concentrate an observer's attention on the container finish zones the forward edge 95 of the shield 92 preferably curves downwardly slightly and there is provided an upwardly extending plate member 97 bolted or otherwise secured to the supporting framework 13 adjacent the front edge of the conveyor belt 29. The plate 97 extends upwardly and terminates at a location in close juxtaposition or proximity to the containers and slightly below the container finish zone so that there is exposed to the observer's view substantially only those portions which the operator is presently inspecting for defects. The interior wall of the upwardly extending plate member 97 is preferably some dark color to minimize interfering reflections or light, and the upper or exposed surface of the conveyor belt 29 is also preferably of dark color so that the light rays do not tend to cause interfering light reflections.

The major portion of the illumination which strikes the finish zones of containers emanates from the fluorescent tube 90, strikes the white paper or other unglazed surface at the front wall of the shield or reflector 92, and is directed toward and through the finish zones of the moving containers. Since the eye of an observer receives only those light rays reflected by the unglazed surface at the front face of the shield 92 there is no glare; the relatively soft light thus directed against the finish areas of the containers has been found to clearly reveal any defects present.

Preferably the ends of the shield or reflector 92 are a dull black in order to increase the contrast. The eyes of an observer see clearly through the finish zones except at those points where defects exist. Checks, slivers, cavities and the like show up clearly so that the observer may readily detect them and quickly remove defective containers. Where defects such as chips, crinkles, ridges or the like exist in the container, light reflected from the shield 92 does not appear to pass through the defect but to come from some additional direction; as a result the defects show up clearly. It has been found that when an observer's eye is positioned at about 30° above the finish zone optimum viewing exists and defects are readily detectable.

As the observer notices most particularly those portions of the container finish which are closest to him it is desirable to rotate containers as they move through the finish zone inspecting means with the belt 29. As illustrated in Fig. 9 this rotation is achieved by the provision of a plurality of inwardly extending yieldable fingers 98 including rubber contact tips 100, a coiled spring body 101 and securing bolts or the like 102, the yielding fingers being carried by the upwardly extending shield plate 97. As containers move along with the conveyor belt 29 they come into contact with the inwardly extending ends of the yieldable fingers and the yieldable fingers tend to retard one side of each container which they contact; as a result a container rotates during its movement with the conveyor belt 29 and as it passes along the back guide member 104 which extends lengthwise through the container finish inspection means. While only three of the contact arms 98 are shown in the fragmentary view of Fig. 10, any suitable number may be utilized.

An arm rest 105 may be provided at this container finish inspection station for the convenience of the observer, the arm rest being supported on a bracket 106 bolted to the front part of the conveyor supporting structure 13.

From the finish zone inspection station 5 containers pass in continuously moving single file to the container side inspection station or means 6 (Figs. 1 and 2) supported on the conveyor structure 13 by bolts or the like. The side inspection means is illustrated more fully in Figs. 11 and 12. The container side inspection means comprises a box-like chamber or compartment having apertured end walls 108 and 109, a removable top wall or cover 110, rear wall 111, bottom wall 112 and front wall 113. The front wall 113 extends downwardly only partially over the front of the side inspection means to leave a viewing opening 114 at the lower portion of and extending across the width of the front of the compartment. A visor 119 adjustably supported by a nut and bolt 120 on an inwardly extending wall 121 has its lower edge terminating closely adjacent the containers and normally conceals from view the upper finish zones of containers moving along with the conveyor belt 29; in this manner an observer looking into the compartment through the front opening 114 has his attention concentrated primarily upon the upwardly extending side wall portions of the moving containers.

A plurality of lamps or fluorescent tubes 123 are shown supported at the interior of the cover or top member 110 and illumination from them passes downwardly to illuminate the row of containers 3 passing through the compartment on the belt 29. Preferably light from the fluorescent tubes 123 passes through a translucent sheet of paper 125 or the like supported on a ledge 126; this effects an even diffusion of light and minimizes the possibility of objectionable glare striking the moving containers and interfering with their examination. The member 121 prevents or minimizes the possibility of light from within the compartment passing directly into the eye of an observer and also tends to shield "front" portions of the containers and thereby minimize glare which would otherwise be caused by reflected rays from the lamps 123.

Rotation of the moving containers 3 to facilitate inspection of the side walls may be obtained by yieldable fingers 128, similar to those described in connection with Figs. 9 and 10, carried by the visor 119. The yieldable fingers contact moving containers and effect rotation of them; a back guide rail 129 extending through the container side inspection compartment maintains the containers in correctly disposed positions transversely of the conveyor 29.

Opposite ends walls of the container side inspection means are preferably painted a dull black or coated with black velvet. The rear wall at the interior is preferably painted a dull black or coated with black velvet over a portion of its area lengthwise of the conveyor, and covered with an unglazed white paper for the remaining portion thereof lengthwise of the conveyor. Substantially all light which strikes the moving containers comes from above and defects such as a grain of sand, a pebble, or a crack in the sides of a container normally show up as a bright spot against the black background of the rear wall 111; the contrasting effect is quite spectacular and there is no difficulty in spotting and eliminating defective containers. While the black background is found suitable in most instances, in some cases it is desirable to utilize both the black background and the white paper background for the reason that the additional white paper background tends to show up some types of defects more readily than the black background. An observer using both white paper and black velvet background in the same container side inspection compartment may observe containers passing against each of the backgrounds without difficulty. Making the interior end walls of the side inspection compartment a dull black or coating them with black velvet has been found to cut down or mask off light from extraneous sources.

An arm rest 131, for the convenience of an observer, may be carried by a bracket 132 bolted or otherwise secured to the structure 13 of the machine.

In some instances it may be desired to utilize a single continuous belt for the conveyor means in lieu of separated belts 28 and 29 and to omit supporting containers 3 by spaced guide members 59 and 60 during movement through the bottom inspection compartment. Where desired a single belt may be provided extending around the pulleys 24 and 25 located adjacent the entrance and exit ends of the machine illustrated in Figs. 1 and 2. In such event the upper and lower flights of the belt will extend across the space occupied in Figs. 1 and 2 by the container bottom inspection means.

Where the single belt is utilized, in lieu of the container bottom inspection means illustrated in those two figures, there may be employed a container bottom inspection means shown in Fig. 13. This inspection means comprises a fluorescent tube 137 positioned lengthwise adjacent the front edge of the conveyor belt 138, the fluorescent tube being provided with a shield or cover at its outwardly disposed edge so that light emanating from the tube is directed toward the moving belt 138 and containers 3 thereon, and so that illumination from the tube does not strike directly into the eye of an observer; an inclined and preferably adjustable reflector 139 is positioned at an angle above the moving row of containers 3 so that an observer looking into the reflector past the fluorescent tube 137 may readily see the bottoms of containers moved along on the traveling belt 138.

The exterior or upper surface of the belt 138 is preferably black or of a dark color so that the combination of light from the fluorescent tube 137 and the dark surface of the belt 138 will be effective to clearly reveal defects existing in the bottom walls of the containers. This form of container bottom inspection means possesses the desirable feature of providing a stationary support for the containers moving along with the belt; that is, there is no relative movement between the containers and the supporting surface which might, in some cases, interfere with the observer's examination or inspection of the container bottom walls. While optimum results are achieved with a black surface belt it is not essential that the belt be absolutely black since a dark brown surface is satisfactory.

In Fig. 14 there is illustrated another form of container rotating means which may be used at either the container finish zone inspection station or at the container side inspection stations, or at both of said stations. As shown in this figure the traveling conveyor belt 142 moves containers 3 between the spaced side members 143 toward inwardly projecting guides 144 and 145. The leading edge or initial contacting edge of the guide 144 positioned adjacent the front edge of the belt 142 is preferably of an abrupt curvature so that containers are moved quickly toward one side of the belt and into contact with an angular portion of the oppositely disposed guide member 145. The trailing edge of the front guide member 144 is of gradual inclination and substantially matches that of the opposite guide member 145.

Containers moving along with the belt 142 first come into contact with the leading edge 146 of the front guide member 144 and are moved transversely into contact with the edge of the opposite guide member 145; preferably the leading edge of the opposite guide member is provided with a rubber strip 147. As the containers contact the rubber strip 147 the strip tends to apply a braking action at one side of the container; this, combined with the forward movement of the containers effect rotation of them during movement through the particular inspection device with which the rotation means is used. As the containers move gradually along the strip 147 they slowly rotate so that an operator may readily view different portions of them.

In Figs. 15 and 16 there is illustrated still another form of container rotating means which has given good results. Here again, this particular container rotating means may be used with either the side wall inspecting devices, with the container finish inspecting devices, or with both of them. Good results have been achieved by utilizing the device of Fig. 15 with the container side inspection means and the device of Fig. 14 at the container finish inspection means.

As shown in Figs. 15 and 16, an inclined angle member 150 has a leg 155 thereof projecting inwardly beneath the surface of the conveyor belt 151. As an area on the traveling belt 151 approaches the inwardly projecting leg 155 of the angle member 150 it is gradually elevated to tilt the front edge of the conveyor belt upwardly. Containers being moved by the belt are correspondingly tilted until their side edges come into contact with a longitudinally extending back guide rail or member 152. The forward movement of the belt 157 with the containers, combined with the movement of the containers along the back guide rail 152 is effective to rotate the containers; the contact of the containers with the back guide rail 152 applies a slight braking action or rotative force which is effective to slowly rotate the containers as they move in front of an observer or inspector.

It will be seen that the present invention provides a new and improved container inspecting machine which is adapted to facilitate the ready detection of imperfections which may exist in the bottom walls, side walls, or finish zones of glass containers and the like. The possibility of particles of glass remaining in the containers after inspection are minimized and serious body injury resulting therefrom are avoided. In addition, law suits and complaints are eliminated by utilizing the present improved means of showing up extraneous particles. The machines may be utilized at the end of the leer just prior to packing the containers in cartons and thus minimize the labor required in inspecting. The machines may also be utilized by the packer at the entrance of the containers to the filling and sealing machines. There are no complicated systems of vari-colored lights or lenses, nor complicated mechanisms which must be operated in connection with inspection procedures. The present inspecting machine may be used by relatively inexperienced operators or observers. In practice the operators may rotate from one station to another at suitable intervals in order to minimize any possibility of objectionable fatigue. Containers move in continuous file through the machine and only those containers which are defective need be touched and removed by an observer; all other containers may pass continuously through the machine.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A mechanism for use in inspecting sealing zones and side walls and bottom walls of glass containers and the like comprising the combination of supporting means, conveyor means on said supporting means for moving said containers along a path, drive means for continuously actuating said conveyor means and moving said containers past a plurality of stations, shielding means at one of said stations extending along a front portion of the conveyor means having a substantially opaque portion projecting up alongside the path of movement of said containers and disposed in front of said containers with an upper edge of the shielding means terminating in close proximity to the containers at a location spaced below upper ends of said containers for concealing side walls and exposing to the view of an inspector only the sealing zones of said containers, shielding means at another of said stations extending along a front portion of the conveyor means having a substantially opaque portion spaced above said conveyor means and disposed in front of said containers with a lower edge of the shielding means terminating in close proximity to the containers at a location spaced below the sealing zones of said containers for concealing said sealing zones and exposing to the view of an inspector only the side walls of said containers, and further shielding means at still another of said stations extending along a front portion of the conveyor means having a portion disposed in front of said containers concealing the sealing zones and side walls of the containers and exposing to the view of an inspector only said bottom walls of the containers, whereby containers emerging from said mechanism have been presented for inspection at all desired portions thereof.

2. A mechanism for use in inspecting sealing zones and side walls and bottom walls of glass containers and the like comprising the combination of supporting means, conveyor means on said supporting means for moving said containers along a path, guide members extending along said conveyor means for maintaining containers in single file thereon, a rotatable disk adjacent one end of said conveyor means for delivering containers thereto, a second rotatable disk adjacent an opposite end of said conveyor means for removing containers therefrom, drive means for continuously actuating said conveyor means and said rotatable disks and moving said containers past a plurality of stations, shielding means at one of said stations having a substantially opaque portion projecting up alongside the path of movement of said containers but with an upper edge terminating below upper ends of said containers for concealing side walls and exposing to the view of an inspector the sealing zones of said containers, shielding means at another of said stations having a substantially opaque portion spaced above said conveyor means but with a lower edge terminating below the sealing zones of said containers for concealing said sealing zones and exposing to the view of an inspector the side walls of said containers, and further shielding means at still another of said stations having a portion concealing the sealing zones and side walls of the containers and exposing to the view of an inspector said bottom walls of the containers, whereby containers emerging from said mechanism have been presented for inspection to all desired portions thereof.

3. A mechanism as claimed in claim 1 in which said conveyor means has a plurality of belts disposed in end-to-end spaced relationship and in which said further shielding means is located intermediate said spaced ends of the belts.

4. A mechanism for use in inspecting sealing zones and side walls of glass containers and the like comprising the combination of supporting means, conveyor means on said supporting means for moving said containers along a path, drive means for continuously actuating said conveyor means and moving said containers past a plurality of stations, shielding means at one of said stations extending along a front portion of said conveyor means having a substantially opaque portion projecting up alongside the path of movement of said containers and disposed in front of said containers with an upper edge of the shielding means terminating closely adjacent the containers at a location spaced below upper ends of said containers for concealing side walls and exposing to the view of an inspector only the sealing zones of said containers, and shielding means at another of said stations extending along a front portion of the conveyor means having a substantially opaque portion spaced above said conveyor means and disposed in front of said containers with a lower edge terminating closely adjacent the containers at a location spaced below the sealing zones of said containers for concealing said sealing zones and exposing to the view of an inspector only the side walls of said containers, whereby containers emerging from said mechanism have been presented for inspection at all desired portions thereof.

5. A mechanism as claimed in claim 4 in which a stationary container guiding member extends along the conveyor means adjacent at least one of said shielding means, and in which said conveyor means is tilted toward said guiding member for causing containers to lean against and roll along said guiding member as the conveyor means is actuated.

6. A mechanism for use in inspecting sealing zones and side walls of glass containers and the like comprising the combination of supporting means, a conveyor carried by said supporting means for moving said containers past a sealing zone inspection station and a side wall inspection station, a substantially imperforate shielding element at said sealing zone inspection station extending along a front portion of the conveyor having a top edge in close juxtaposition to said containers and extending down from said top edge in front of said containers and concealing said container side walls, an additional substantially imperforate shielding element at said side wall inspection station extending along a front portion of the conveyor having a bottom edge in close juxtaposition to said containers and extending up from said bottom edge in front of said containers and concealing said container sealing zones, said top and bottom edges of the shielding elements being located in close juxtaposition to the juncture of the container sealing zones and side walls and each at about the same distance above the conveyor for exposing to the view of an inspector only sealing zones at the sealing zone inspection station and exposing to the view of an inspector only side walls at the side wall inspection station, whereby containers emerging from said mechanism have been presented for inspection at all desired portions thereof.

7. A mechanism for use in inspecting sealing zones and side walls of glass containers and the like comprising the combination of supporting means, a conveyor carried by said supporting means for moving said containers past a sealing zone inspection station and a side wall inspection station, a shielding element at said sealing zone inspection station having a top edge and extending down from said top edge and concealing said container side walls, an additional shielding element at said side wall inspection station having a bottom edge and extending up from said bottom edge and concealing said container sealing zones, said top and bottom edges of the shielding elements being located adjacent the juncture of the container sealing zones and side walls and each at about the same distance above the conveyor for exposing to the view of an inspector only sealing zones at the sealing zone inspection station and exposing to the view of an inspector only side walls at the side wall inspection station, stationary container guiding means extending along the conveyor at a location spaced from said shielding elements, and yieldable means carried by said shielding elements for urging containers against said guiding means to rotate the containers, whereby containers emerging from said mechanism have been presented for inspection at all desired portions thereof.

8. A mechanism as claimed in claim 6 in which guide means project inwardly over said conveyor from opposite side edges thereof adjacent at least one of said shielding elements and in which an innermost edge of one of said guide means has a different frictional coefficient than the other for effecting rotation of containers during passage thereof between said guide means as the conveyor moves.

9. In a device for inspecting glass containers and the like, the combination of a conveyor for supporting and moving said containers, a compartment directly overlying a portion of said conveyor having apertured end walls with portions thereof projecting outwardly from opposite side edges of said conveyor for excluding exterior light, means within said compartment for illuminating containers therein, and a substantially opaque front wall portion spaced above and extending longitudinally of said conveyor with a lower edge normally terminating below upper ends of containers on the conveyor and in close proximity to side portions of the containers for concealing said upper ends and exposing to the view of an inspector lower portions only of said containers.

10. A device as claimed in claim 9 in which a stationary guide member extends along the conveyor at a location spaced from said front wall portion, and in which yieldable means is carried by said front wall portion for urging containers against said guide member to rotate them.

11. A device as claimed in claim 9 in which said means for illuminating the containers comprises at least a single fluorescent tube lamp located only at the upper part of said compartment.

12. A mechanism as claimed in claim 4, in which a fluorescent tube is provided adjacent the container sealing zone inspection station and a fluorescent tube is provided adjacent the container side wall inspection station for illuminating containers at said stations.

13. In a device for inspecting glass containers and the like, the combination of conveyor means comprising a plurality of endless conveyor belts disposed in end-to-end spaced relationship, drive means for actuating said conveyor belts, shielding means intermediate spaced portions of the conveyor belts for concealing the sealing zones and side walls of the containers moved by the belts, means extending between said belts for supporting containers adjacent their upper portions during movement from one belt to the other, and means operatively interconnecting said conveyor belts for effecting movement of each at substantially the same speed.

14. A device as claimed in claim 13, in which said container supporting means comprises horizontally spaced substantially parallel guide members, and in which there is provided a longitudinally extending dark colored strip beneath the space intermediate said spaced members, and illuminating means below said guide members and adjacent said dark colored strip is adapted to illuminate bottom portions of containers moving between said spaced guide members.

HARRY E. STOVER.

REFERENCES CITED

The following references are of record in the file of this patent:

UNITED STATES PATENTS

| Number | Name | Date |
| --- | --- | --- |
| 1,446,161 | Cushman et al. | Feb. 20, 1923 |
| 1,947,142 | Ward et al. | Feb. 13, 1934 |
| 2,099,185 | Adrian | Nov. 16, 1937 |
| 2,101,741 | Ketcham | Dec. 7, 1937 |
| 2,174,848 | Stahmer | Oct. 3, 1939 |
| 2,219,572 | Everett | Oct. 29, 1940 |
| 2,236,945 | Gibbs | Apr. 1, 1941 |
| 2,296,027 | Gettleman | Sept. 15, 1942 |
| 2,318,856 | Hoffman | May 11, 1943 |
| 2,321,331 | Sweezey | June 8, 1943 |
| 2,335,686 | Mercur | Nov. 30, 1943 |
| 2,368,350 | Ellison | Jan. 30, 1945 |
| 2,395,620 | Fogle | Feb. 26, 1946 |
| 2,411,991 | England | Dec. 3, 1946 |
| 2,446,377 | Marshall | Aug. 3, 1948 |
| 2,468,663 | Green | Apr. 26, 1949 |
| 2,481,863 | Owens | Sept. 13, 1949 |